United States Patent [19]
Tuttobene

[11] Patent Number: 5,020,958

[45] Date of Patent: Jun. 4, 1991

[54] ARTICLE VENDING MACHINE

[76] Inventor: Philip Tuttobene, #148, 22979 Barton Rd., Grand Terrace, Calif. 92324

[21] Appl. No.: 315,345

[22] Filed: Feb. 23, 1989

[51] Int. Cl.[5] .......... B65G 1/00

[52] U.S. Cl. .......... 414/281; 221/88; 414/273

[58] Field of Search .......... 414/273, 277, 278, 280, 414/281; 194/205, 210, 212, 213; 221/88; 364/479; 235/381

[56] References Cited

U.S. PATENT DOCUMENTS

| | | | |
|---|---|---|---|
| 4,598,810 | 7/1986 | Shore et al. | 194/205 |
| 4,639,875 | 1/1987 | Abraham et al. | 364/479 |
| 4,668,150 | 5/1987 | Blumberg | 414/280 |
| 4,789,054 | 12/1988 | Shore et al. | 221/88 |
| 4,812,629 | 3/1989 | O'Neil et al. | 235/381 |
| 4,814,592 | 3/1989 | Bradt et al. | 235/381 |
| 4,824,311 | 4/1989 | Mims | 414/273 |
| 4,839,875 | 6/1989 | Kuriyama et al. | 235/381 |
| 4,903,815 | 2/1990 | Hirschfeld et al. | 414/280 X |

FOREIGN PATENT DOCUMENTS

| | | | |
|---|---|---|---|
| 8602758 | 5/1986 | World Int. Prop. O. | 221/88 |

*Primary Examiner*—Ed Swinehart
*Attorney, Agent, or Firm*—Stetina and Brunda

[57] ABSTRACT

An article handling method and system for an article handing machine operable by users having identification (ID) cards bearing user identifying codes for vending and/or receiving articles which bear article identifying codes and are stored within storage bins in the machine. The article handling system includes a novel article transport and a novel user and article code reading arrangement. The article transport is selectively operable in a vending mode to transport user-selected articles from their storage bins to a position accessible to machine users for removal of the selected articles from the later return of the articles to the machine and in a return mode to transport returned articles from the user accessible position to their storage bins. The user and article code reading arrangement embodies a single common code reader for reading both the user code on user ID cards inserted into the machine and the article codes on articles vended to and returned by machine users. The disclosed article handling machine is a vending machine which vends user-selected magnetic tape cassettes, such as video cassettes, in response to insertion of a proper user ID card and rental fee into the machine and embodies a novel telephone cassette reservation feature, cassette/storage bin association feature, and rental fee credit feature for prompt cassette return.

17 Claims, 5 Drawing Sheets

FIG. 7a
FIG. 6
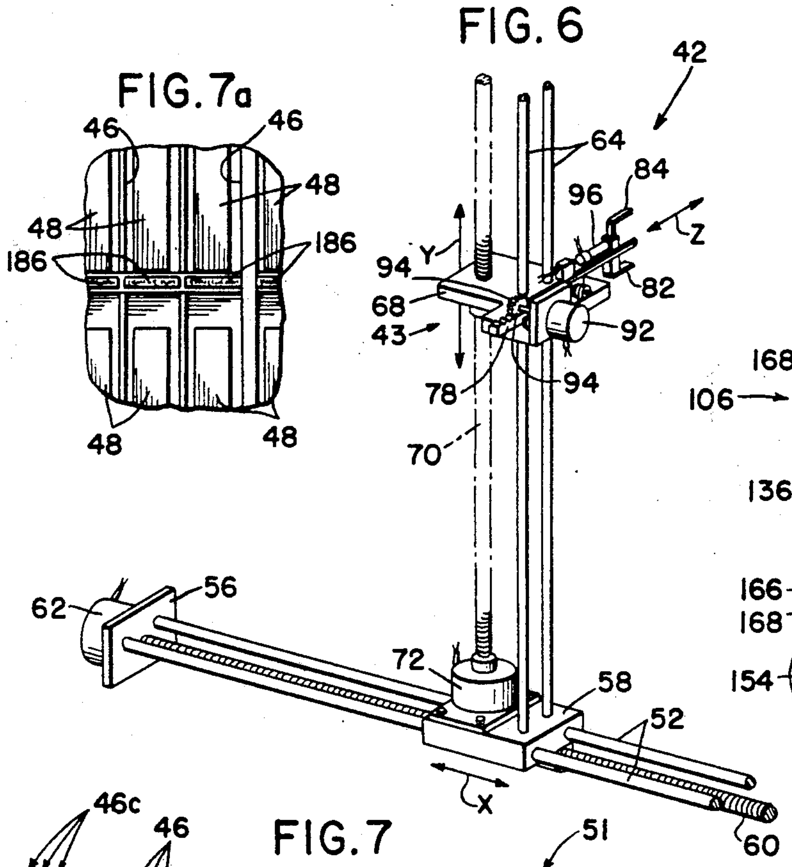
FIG. 8a
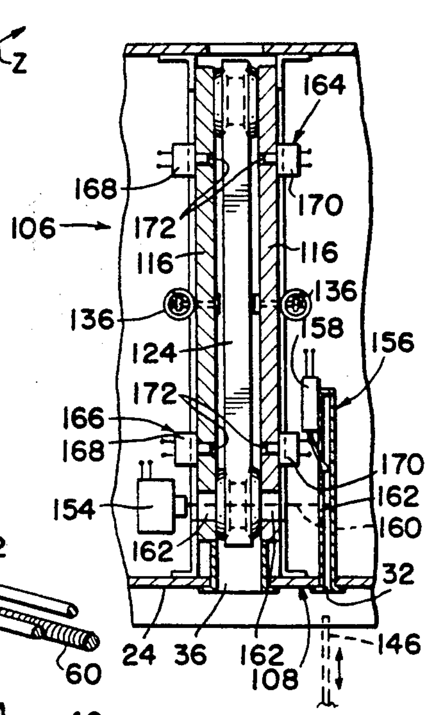
FIG. 7
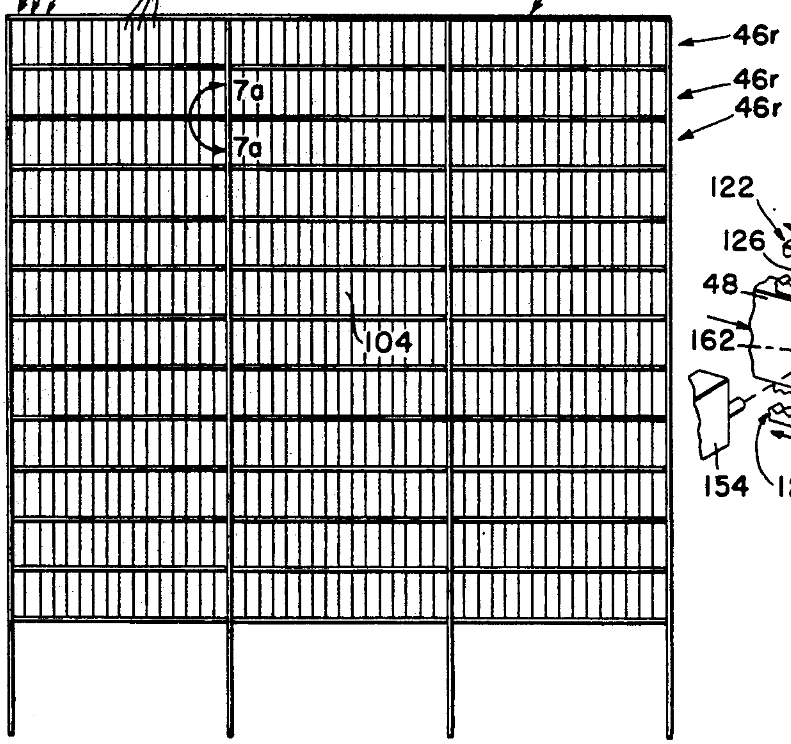
FIG. 8
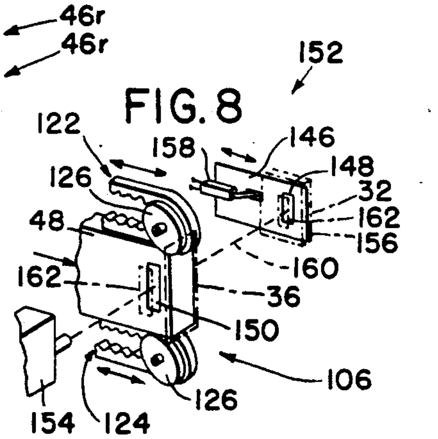

ARTICLE VENDING MACHINE

FIELD OF THE INVENTION

This invention relates generally to article handling systems and more particularly to improvements in article handling systems of the class which have storage bins or the like for containing articles to be handled and are selectively operable by users of the systems to deliver selected articles from their storage bins to the users and/or receive returned articles from the users and return the articles to their storage bins.

DISCUSSION OF THE PRIOR ART

As will become evident from the ensuing description, the improvements of this invention may be utilized to advantage in a variety article handling applications. However, the invention is particularly concerned with the automatic handling of magnetic tape cassettes, especially video cassettes, in a vending machine for dispensing selected cassettes to and receiving returned cassettes from users or customers of the machine. The invention will be described in this context.

The use of video cassettes for television viewing is gaining ever increasing popularity. Up to relatively recently, such video cassettes were available for rent or sale only in video rental stores. The number and locations of such video stores in any given locale are limited by available store space, potential customer base, and other marketing considerations. As a result, it is impossible to situate video stores in a large number of favorable locations. Also, each store services a relatively large number of customers so that each transaction at a store may involve a substantial wait.

A relatively recent entrant in the video cassette rental field which minimizes or eliminates these and other disadvantages of video rental stores are automatic video cassette vending machines. Such a vending machine contains or stores a relatively large number of video cassettes and is selectively operable in a cassette rental mode to dispense a selected cassette to a customer and in a cassette return mode to receive a returned cassette from a customer. These machines are relatively small in size (compared to a video rental store, for example), totally automatic in operation, do not require the presence of an attendant, and may be installed at virtually any favorable location, such as in a store which markets other products.

Simply stated, a typical video cassette vending machine includes (a) means for receiving cash and/or an identification (ID) card, such as a credit card or membership card, from a customer and validating the same; (b) a keyboard or the like operable by the customer to input a customer PIN number (personal identification number), select the cassette vending mode or cassette return mode, select a particular cassette to be vended in the cassette vending mode, and input other information and/or instructions; (c) means for vending the selected cassette to the customer during operation of the machine in its vending mode and receiving and storing a cassette returned by a customer during operation of the machine in its return mode; and (d) record keeping means for recording the machine transactions (customer identification, charges, credits, cassettes dispensed and returned, etc.)

Examples of such video cassette vending machines are described in U.S. Pat. Nos. 4,414,467, 4,519,522, 4,598,810 and 4,734,005. U.S. Pat. No. 4,598,810 discloses two different types of cassette vending machines. In one, the video cassettes are stored in storage bins which open thru the front side of the machine and are directly accessible to customers for removal and insertion of cassettes from and into any selected bins. The cassettes are normally locked against removal from their storage bins. Operation of the machine by a customer to vend a selected cassette releases that cassette for removal from its storage bin by the customer. When returning the cassette, the customer inserts it directly into its storage bin, and the cassette is automatically locked in the bin.

The other type of cassette vending machine disclosed in U.S. Pat. No. 4,598,810 has cassette storage bins enclosed within the machine housing and a transport mechanism for selectively transporting cassettes between the storage bins and an access opening which is accessible to a customer for removal of a cassette from and insertion of a cassette into the machine. Operation of this latter type of vending machine by a customer to vend a selected cassette activates the transport mechanism to transport the selected cartridge from its storage bin to the access opening from which the cartridge is removable by the customer. When returning the cassette, the customer places it in the access opening, and the transport mechanism is activated to transport the cassette from the opening to its assigned storage bin. U.S. Pat. Nos. 4,414,467, 4,519,522, 4,734,005 also disclose video cassette vending machines of this latter type.

The prior art is replete with other patents describing a vast assortment of automatic article handling systems or machines which store articles such as file containers, security boxes or the like in storage bins and are selectively operable to deliver selected articles from their storage bins to users and return the articles to their storage bins. Following is a list of such patents: U.S. Pat. Nos. 3,297,379, 3,526,326, 3,964,577, 4,300,040, 4,546,901, 4,681,504.

SUMMARY OF THE INVENTION

According to its broader aspects, this invention provides an improved article handling system of the general class described in U.S. Pat. No. 4,734,005. Simply stated, the overall article handling system of the invention comprises (a) article storage means for containing articles to be handled, (b) transport means for transporting articles between the storage means and a position, referred to herein as a user accessible position or simply an accessible position, which is accessible to users of the system for removal of articles from and/or placement of articles in such accessible position, and (c) control means presetable by a user for selectively actuating the transport means to remove a selected article from the storage means and deliver the article to the user accessible position and/or retrieve from the user accessible position an article returned by a user and return the article to the storage means. An actual article system according to the invention may include other useful means, such as record keeping means for recording each operation of the system including the type of operation, i.e. dispensing of an article to a user or retrieval of an article returned by a user, and the identities of the article and the user.

One important improvement feature of the invention resides in the construction and arrangement of the transport means for transporting articles between their storage bins and the user accessible position. This transport means is uniquely constructed and arranged to perform its function and includes article gripping jaws, means for opening and closing the jaws to grip and release articles, means for moving the jaws between positions opposite selected storage bins and a home position opposite the user accessible position, and means for extending and retracting the jaws toward and away from the storage bins and the user accessible position. The preferred transport means also includes an infeed/outfeed conveyor for feeding articles between the gripping jaws when in their home position and the user accessible position.

Another important improvement feature of the invention is concerned with dispensing or vending and receiving returnable articles which bear article-identifying codes, referred to herein as article codes, to and from users having identifiers such as membership cards or credit cards, referred to herein as user ID's, bearing user-identifying codes, referred to herein as user codes. According to this feature of the invention, the control means of the article handling system comprises (a) means for receiving a user ID, (b) means operable by the user for selectively presetting the article handling system in a first operating mode, referred to herein as an article dipensing or vending mode, in which the system is conditioned to deliver a selected article to the user, and a second operating mode, referred to herein as an article return mode, in which the system is conditioned to receive a returned article from a user, and for selecting a particular article to be dispensed in the dispensing or vending mode, (c) means for reading the user codes on user ID's which are inserted into the ID receiving means and the article codes on articles which are dispensed to and/or received from users of the handling system, and (d) means for effecting operation of the article handling system in the operating mode selected by a user in response to reading of a valid user ID code to deliver the article selected by the user from the article storage means to the user accessible position in the dispensing or vending mode and to return an article returned by a user to the storage means in the return mode. According to the invention, the means for reading the user and article ID codes comprises a single common code reader for reading both the user code on a user ID inserted into the handling system and the article code on the article being dispensed to the user in the vending mode or being returned by a user in the return mode of the article handling system.

The user and article codes are read in the vending mode of the article handling system in order to verify the user ID and verify that the article being dispensed or vended is the same as that selected by the user. In the return mode, the user and article codes are read to verify the user ID and identify the article being returned. According to the preferred practice of the invention, conventional bar codes are utilized as the user and article codes and a conventional optical scanner is utilized as the code reader. This optical scanner is disposed relative to the user ID receiving means of the article handling system and the path along which articles are moved by the article transport means of the system in such a way that during operation of the article handling system in both its article dispensing or vending mode and article return mode, the scanner scans and reads both the bar code on a user ID inserted into the user ID receiving means and the bar code on the article being dispensed or returned. This results in an article handling system of substantially greater simplicity and lower cost.

As noted earlier, the improved article handling system of the invention is capable of adaptation to a variety of article dispensing or vending applications. A present particularly useful application of the invention, however, is vending magnetic tape cassettes, particularly video cassettes. The detailed description of the invention relates to this particular application. The vending machine may embody other novel features in addition to those mentioned above which uniquely adapt the vending machine to its intended purposes.

BRIEF DESCRIPTION OF THE DRAWINGS

FIG. 6 is a fragmentary perspective view of a novel article transport mechanism embodied in the article handling system;

FIG. 7 is a front elevation of an article storage bin array embodied in the article handling system;

Figure 5:
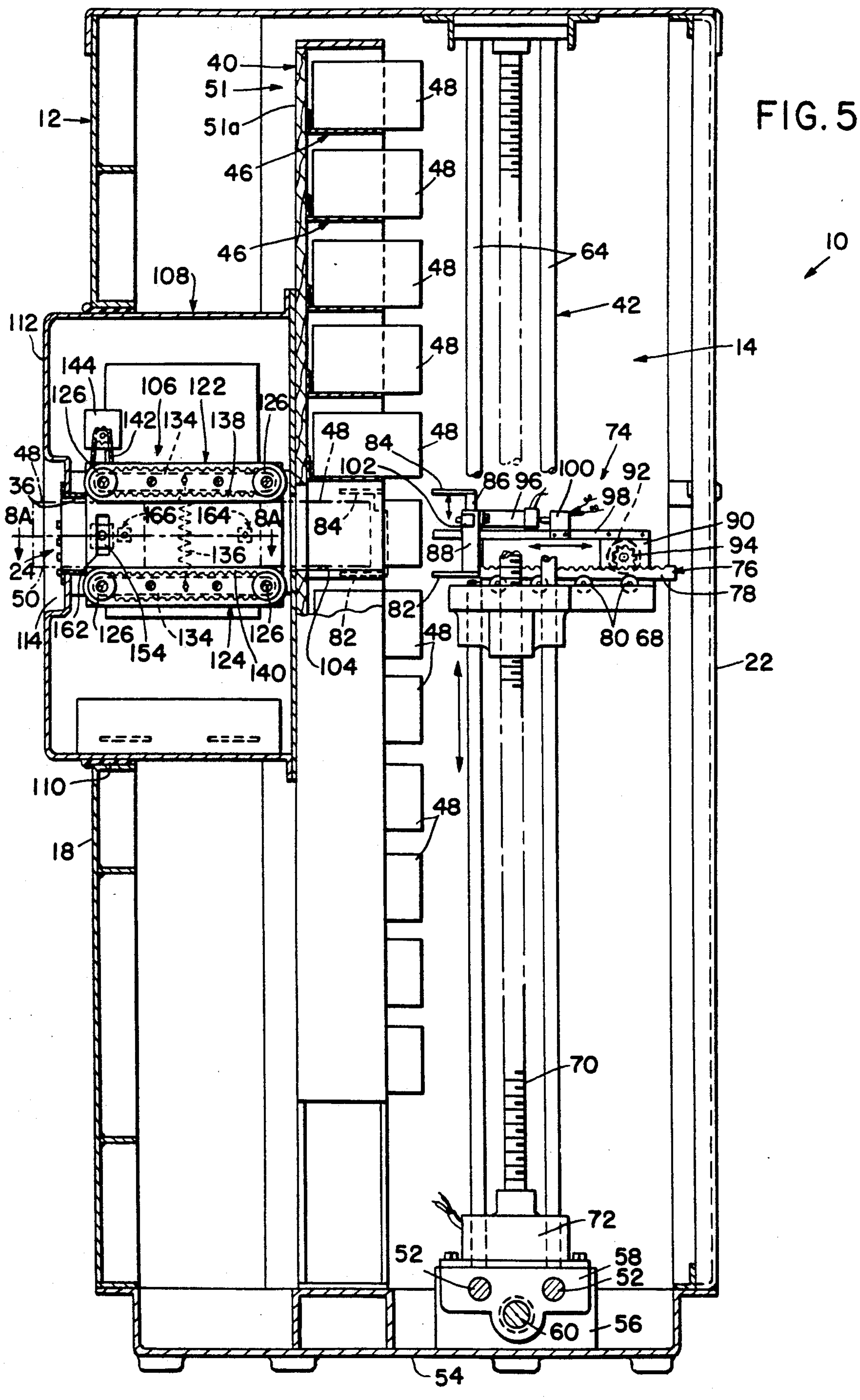
FIG. 5 is an enlarged verticle section through the vending machine showing the article handling system of the invention within the machine housing.
Figure 9:
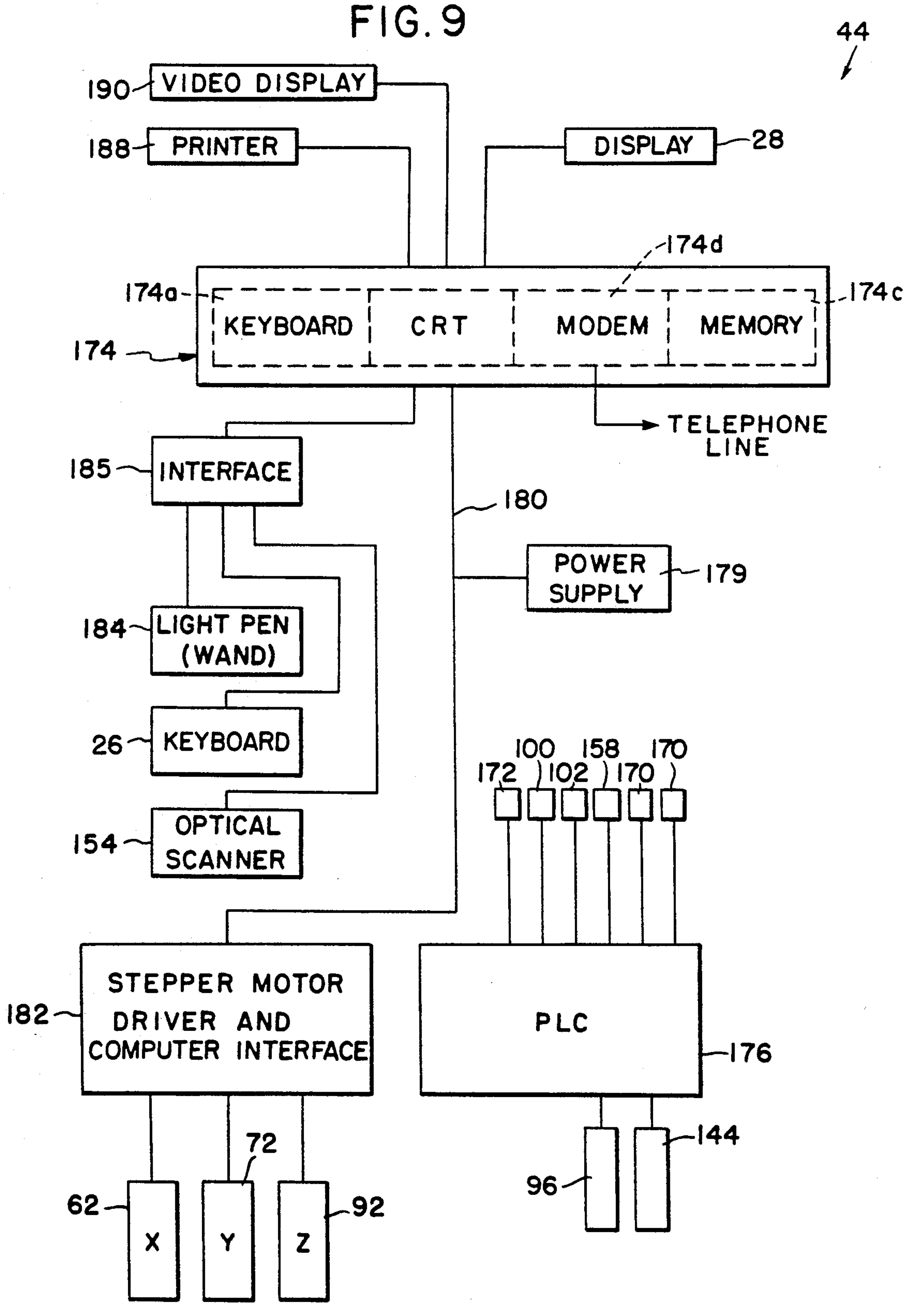
Figure 10A:
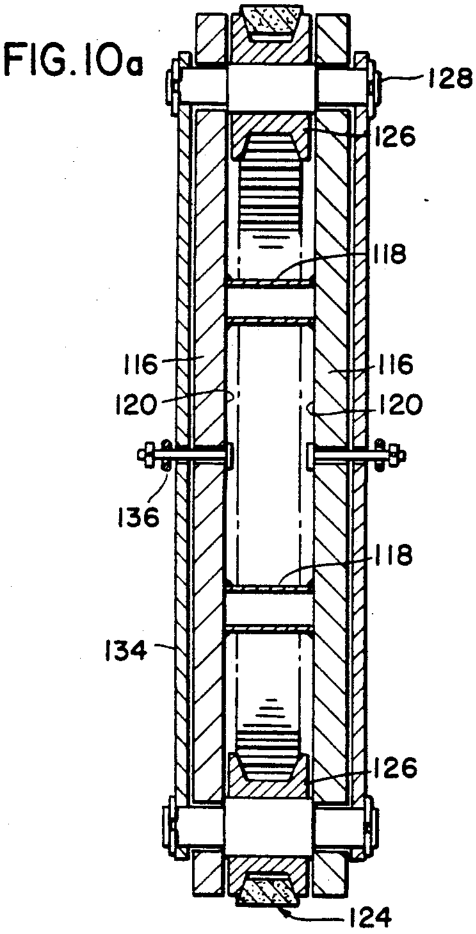
Figure 12:
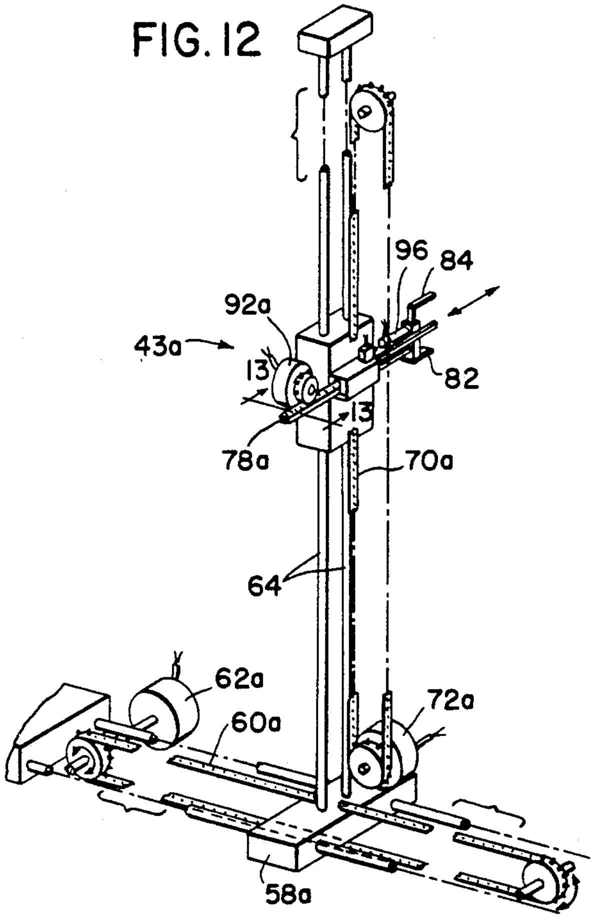
Figure 10:
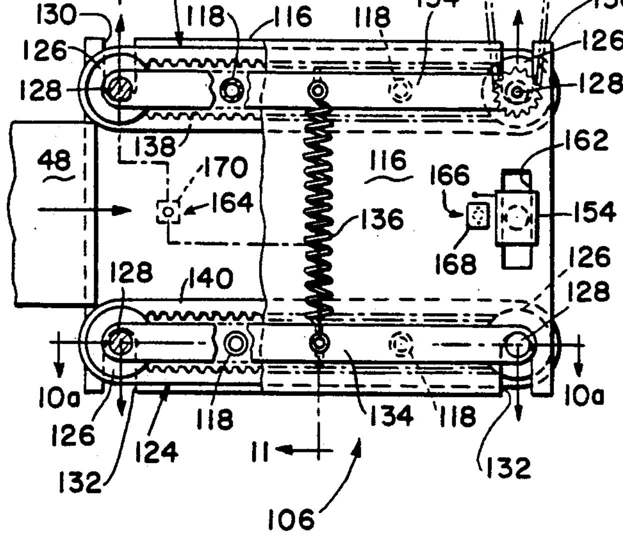
Figure 11:
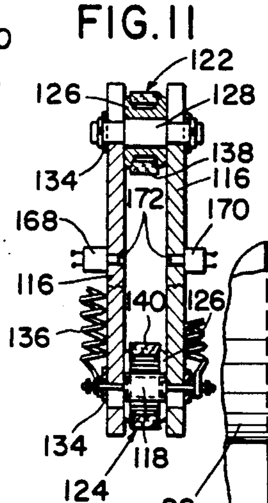
Figure 13:
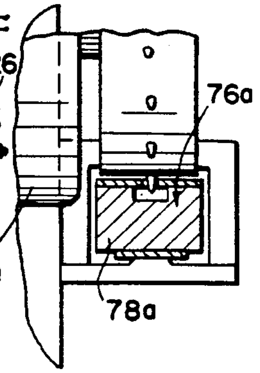

FIG. *7a* is an enlargement of the area encircled by the arrow *7a—7a* in FIG. 7;

FIG. 8 is a fragmentary perspective view of a novel article and user code reading means embodied in the article handling system;

FIG. 8*a* is an enlarged section taken on line 8*a*—8*a* in FIG. 5;

FIG. 9 is a block diagram of the control means of the article handling system;

FIG. 10 is an enlarged fragmentary side elevation, partly in section, of an article infeed/outfeed conveyor which forms part of the article transport mechanism of the article handling system;

FIG. 10*a* is an enlarged section taken on line 10*a*—10*a* in FIG. 10;

FIG. 11 is a section taken on line 11—11 in FIG. 10;

FIG. 12 is a fragmentary perpespective view of a modified article transport mechanism for the present article handling system; and FIG. 13 is an enlarged fragmentary perspective view of the modified transport mechanism in FIG. 12.

DESCRIPTION OF THE PREFERRED EMBODIMENTS

Referring now to these drawings, and first to FIGS. 1-4, there is illustrated an improved article vending machine 10 according to the invention shown in one of its many possible installation arrangements. As mentioned earlier and will become evident as the description proceeds, the vending machine may be utilized for a variety of vending applications including the vending of various types of articles, the vending of returnable articles on a rental basis, and the vending of non-returnable articles for sale. A present preferred application of the vending machine, however, is vending returnable articles, particularly magnetic tape cassettes such as video cassettes, on a rental basis. The invention will be described primarily in connection with this particular application but without any intention of limiting the invention to such application.

Figure 1:
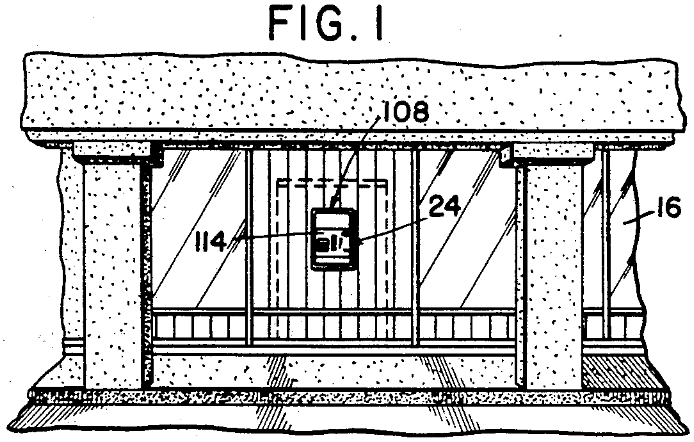
FIG. 1 is a front elevation of an article vending machine, more specifically a cassette vending machine, embodying an improved article handling system according to the invention and showing the machine installed in the front wall of a building, such as a store.
Figure 3:
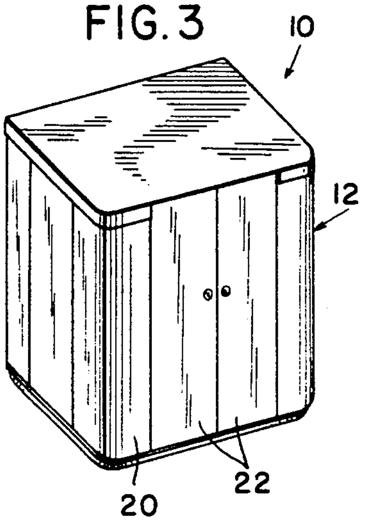
FIG. 3 is a perspective view on reduced scale of the rear side of the machine housing in FIG. 2.
Figure 2:
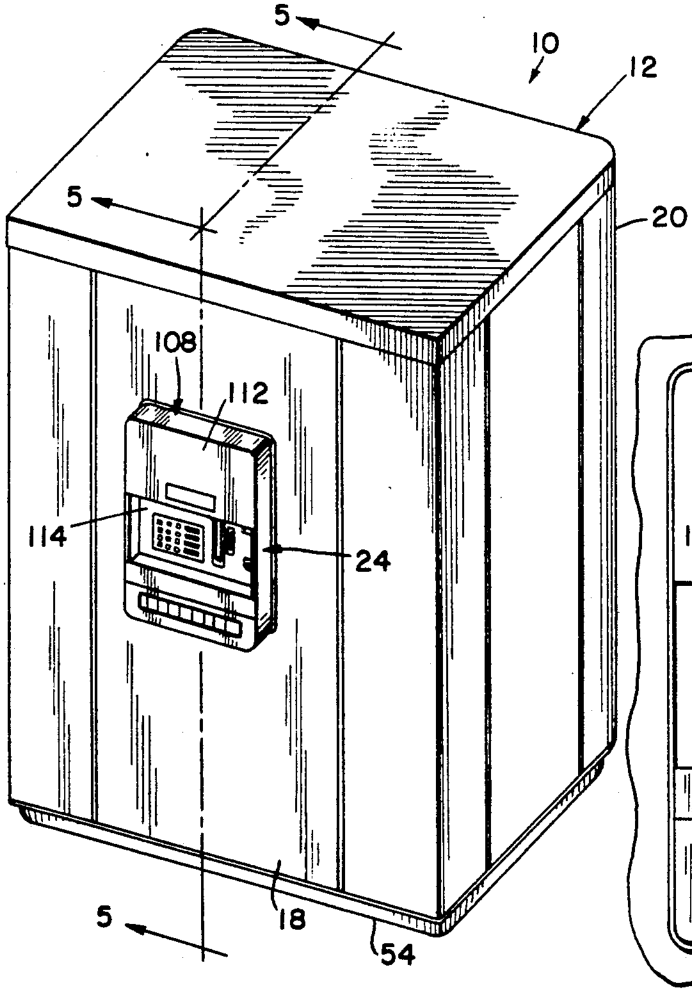
FIG. 2 is an enlarged perspective view of the vending machine housing.
Figure 4:
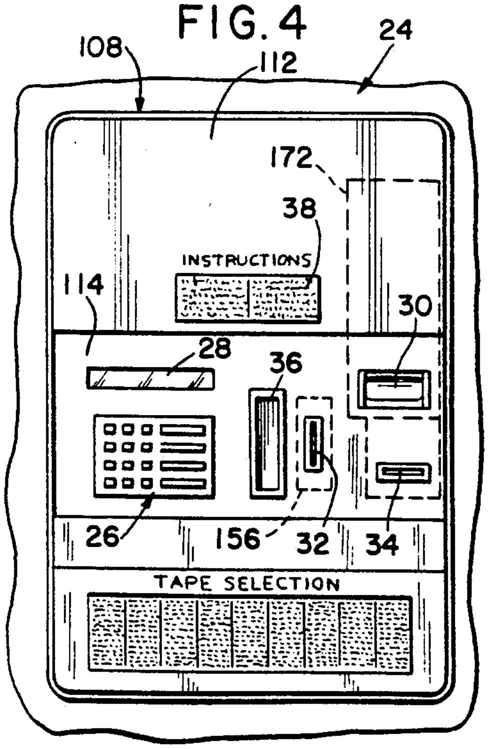
FIG. 4 is an enlarged face view of a front control panel of the vending machine.

With this preliminary explanation in mind, the improved vending machine 10 includes an outer housing 12 enclosing an improved article handling system 14 according to the invention. The vending machine may be installed at various locations and its housing may vary in shape and/or size to accommodate the various installations. FIG. 1 illustrates the vending machine installed in the front wall 16 of a building, such as a store or the like, in somewhat the same fashion as a conventional automatic teller machine (ATM) with the front wall 18 of the housing 12 expposed at the outer side of the store wall 16. At the rear side 20 of the vending machine housing 12 are doors 22 which are accessible to be opened from the inside of the building to provide access to the housing interior.

Mounted on the front wall 18 of the vending machine housing 12 is a control panel 24 which users or customers of the machine utilize to operate the machine. This control panel includes the following elements: a keyboard 26 which a customer uses to input certain instructions into the machine; a display window 28 which displays certain of these customer instructions as they are input by a customer and certain machine generated requests and queries; a paper currency slot 30 into which the customer may insert paper currency to cover an article rental charge and/or security deposit; a card slot 32 into which a customer may insert an identification card, such as a credit card, membership card, or the like (collectively referred to herein as a user or customer ID card); a receipt slot 34 through which a receipt may be dispensed to the customer; an access or article opening 36 through which a customer may remove an article from and return an article to the machine; and printed instructions 38 for operating the machine. As noted earlier, the entire control panel 24 except the card slot 32 may be normally covered by a protective window which is retracted in response to insertion of a valid user or customer ID into the card slot 32. This window is omitted for the sake of clarity.

The improved article handling system 14 contained within the vending machine housing 12 includes article storage means 40, article transport means 42, and control means 44. The article storage means 40 has storage spaces or bins 46 for containing the articles 48 to be vended by the vending machine. The article transport means 42 transports the articles 48 between their storage bins 46 and a position 50 within the control panel access opening 36, referred to herein as a user accessible position, wherein an article is accessible to a user or customer for removal from the machine and to which a customer may return an article. The control means 44 is programmed to actuate the article transport means 42 in accordance with user or customer inputs to the control panel 24.

The improved article vending machine 10 is selectively operable in two different operating modes, namely an article vending mode and an article return mode, in response to user or customer inputs to the control panel 24. These inputs involve insertion of a customer ID into the card slot 32, insertion of a proper cash amount into the currency slot 30, selection of the desired vending machine operating mode, and selection of a particular article to be vended if the customer selects the machine vending mode. In the article vending mode of the machine, the customer's ID and cash deposit are first verified by the control means 44 which then actuates the article transport means 42 to transport the selected article 48 from its storage bin 46 to the user accessible position 50 for removal from the machine by the customer through the access opening 36. In the article return mode of the machine, the customer inserts an article being returned into the access opening 36 which triggers the control means 44 to first verify the identity of the returned article and then activate the transport means 42 for returning the article to its storage bin 46. The control means 44 of a vending machine according to the invention will normally perform various other functions as well, such as recording each machine transaction or operation, including the identities of the customer and article vended or returned, date, time, dollar charge, and other pertinent data, and dispensing to the customer a receipt for a rental deposit and for a returned article.

The illustrated article vending machine 10 of the invention will now be described in more detail by particular reference to FIGS. 5–13 of the drawings. The article storage bins 46 of the article storage means 40 within the machine housing 12 are arranged in a rectangular array 51 (FIG. 7). This array is disposed in a vertical plane just behind and parallel to the front wall 18 of the housing. The storage bin array has horizontal rows **46*r* and vertical columns 46*c* of storage bins. The storage bins 46 are closed at their front ends by a front wall 51*a* of the bin array 51 and open through the rear side of the array. Each storage bin is sized and shaped to receive one article 48 to be handled by the vending machine. In the particular vending application illustrated, the articles 48 are assumed to be magnetic tape cassettes, specifically video cassettes, and each storage bin 46 is essentially a rectangular pocket for receiving a video cassette edgewise with the cassette disposed in a vertical plane normal to the vertical plane of the storage bin array 51. As shown best in FIG. 5, the fore and aft depth of each storage bin 46 is less than the length of a video cassette 48** so that each cassette projects rearwardly a distance from its storage bin.

The article transport means 42 of the article handling system 14 includes an article transport mechanism or conveyor 43 disposed within the vending machine housing 12 immediately behind the article storage bin array 51. As shown best in FIG. 6, this transport mechanism comprises a pair of horizontal guide rods 52 firmly mounted on the housing floor 54 by means of brackets 56 rigidly fixed to the floor. Guide rods 52 parallel one another and the vertical plane of the storage bin array. Slidable on these guide rods for back and forth movement in the x direction in FIG. 6 is a carriage 58. Parallel to the guide rods 52 is a lead screw 60 which is rotatably supported at its ends by the brackets 56. A reversible stepper motor 62 is coupled to the lead screw 60 for driving the screw in rotation. Carriage 58 is threaded on the lead screw 60 for horizontal movement in the x direction by rotation of the lead screw.

Rigidly joined at their lower ends to the carriage 58 are two vertical guide rods 64 which are rigidly joined at their upper ends by a plate 66. These guide rods slidably support a carriage 68 for up and down movement in the y direction in FIG. 6. Parallel to the guide rods 64 is a lead screw 70. The upper end of this lead screw is rotatably supported by the plate 66. The lower end of the lead screw 68 is coupled to a reversible stepper motor 72 mounted on the carriage 58 for driving the screw in rotation. Carriage 68 is threaded on the lead screw 60 for vertical movement in the y direction by rotation of the lead screw 60.

The stepper motors 62, 72 are selectively operable in unison and independently to drive the carriage 68 in the x and y directions in FIG. 6. The carriage 68 may thus be driven in a vertical plane parallel to the storage bin array 51 to any selected position within the x and y limits of travel of the carriage.

Mounted on the carriage 68, which is hereafter referred to in places as an article holding or carriage, is an article gripping assembly 74. This gripping assembly comprises an article holder or gripper 76 including a pinion rack 78 supported by rollers 80 on the article carriage 68 for endwise movement of the rack in the z direction in FIG. 6 toward and away from and normal to the vertical plane of the storage bin array 51. At the front end of this rack are article holding means comprising vertically spaced article gripping jaws 82, 84 which can be opened and closed to hold or grip an article 48, i.e. a video cassette, between the jaws. The lower jaw 82 is a fixed jaw rigidly joined to the front end of the rack 78. The upper jaw 84 is a movable jaw having a right angle rack 86 rigidly joined to its rear end. This upper jaw rack 86 is slidable in an upstanding guide 88 rigid on the rear end of the fixed jaw 82.

Rigidly secured to the article carriage 68 adjacent the rear side thereof is an upstanding bracket 90 mounting a reversible gripper actuating motor 92. The shaft of this motor mounts a pinion 94 which meshes with the gripper rack 78, whereby the article gripper 76 is extendable toward and retractable away from the article storage bin array 51 by the motor. Mounted on the guide 88 for the movable article gripping jaw 84 is a reversible jaw actuating motor 96. The shaft (not shown) of this motor mounts a pinion (not shown) which meshes with the rack 86 of the movable jaw 84, whereby the movable jaw is movable by the motor 96 toward and away from the fixed article gripping jaw 82.

As will be explained in more detail presently, the article gripping jaws 82, 84 are designed to receive the rear end of an article 48, i.e. cassette, in gripping position between the jaws and to then be closed by the jaw actuating motor 96 to grip the cassette. While thus gripping a cassette, the jaws 82, 84 are extendable and retractable by the gripper actuating motor 92 to extend and retract the cassette relative to the article carriage 68. Fixed to the top of the motor mounting bracket 90 is a horizontal bar 98. This bar extends forwardly to a position wherein the front end of the bar is disposed along side the article gripping jaws 82, 84 to laterally support an article or cassette 48 gripped between the jaws when the article gripper 76 occupies its solid line retracted position of FIGS. 5 and 6.

Mounted on the bar 98 behind the gripper actuating motor 96 is a sensing device 100, such as a microswitch, that is actuated from one state to another by the motor 96 upon arrival of the article gripper in its solid line retracted position of FIGS. 5 and 6. A sensing device 102, such as a microswitch, mounted on the guide 88 for the movable article gripping jaw 84 is actuated from one state to another upon entrance of an article or cassette 48 into gripping position between the gripping jaws 82, 84. These sensing devices form part of the system control means 44 to be described later.

As noted earlier, the article storage bins 46 of the article storage means 40 open through the rear side storage means and are closed at their front ends by the front wall 51*a* of the storage means. At one position in the storage bin array 51 is a space 104 having the same dimensions as a storage bin 46 but which opens through both the rear side and the front wall 51*a* of the storage means 40. This open space forms a passageway through the article storage means and is preferably situated at the center of the storage bin array 51. The article transport mechanism 42 is operable to its position of FIG. 5, referred to as its home position, wherein its article gripping jaws 82, 84 are situated at the rear end of the passage way 104.

From the description to this point, it is evident that the motors 62, 72, and 92 are selectively operable to drive the gripping jaws 82, 84 along three mutually perpendicular axes corresponding to the x, y, and z directions, respectively, in FIG. 6. For convenience in the ensuing description, the motors 62, 72, and 92 are referred to in places as x, y, and z axis motors, respectively.

In addition to the article conveyor or transport mechanism 42, the article transport system 14 of the article vending machine 10 comprises an article infeed/outfeed conveyor 106 between the front end of the passageway 104 and the access opening 36 in the control panel 24. As explained in more detail later, when the article transport mechanism 42 occupies its central home position of FIG. 5, the conveyor 106 is operable to feed articles 48 through the access opening 36 and the passageway 104 between the jaws 82, 84 of the transport mechanism and the user accessible position 50. Thus, in the dispensing or vending mode of the vending machine, the conveyor 106 feeds an article being vended from the gripping jaws 82, 84, forwardly through the passageway 104 and access opening 36 to the user accessible position 50. In the return mode of the vending machine, the conveyor feeds an article being returned rearwardly through the access opening and the passageway to the gripping jaws of the transport mechanism.

The article outfeed/infeed conveyor 106 is mounted within an enclosure 108, which is secured to the front wall 51*a* of the article storage means 40 and projects forwardly from this wall and through an opening 110 in the front wall 18 of the machine housing 12, whereby the front wall 112 of the enclosure is exposed at the front side of the machine housing. The enclosure 108 is sealed to the front housing wall 18, as shown. The vending machine control panel 24, which contains the article access opening 36, is disposed within the enclosure 108, just behind the front enclosure wall 112, and is exposed for access by a machine user or customer through an opening 114 in the front enclosure wall.

As shown in FIGS. 5, 8, 10, and 11, the article infeed/outfeed conveyor 106 comprises a pair of spaced parallel side plates 116 which are rigidly joined to one another by connecting means 118. These side plates are rigidly supported in any convenient way within the enclosure 108 in a position wherein the inner confronting surfaces 120 of the plates are substantially coplanar with the inner vertical sides of the passageway 104 through the article storage means 40. Between the side plates 116 are upper and lower conveyor belts 122, 124 trained about pulleys 126 mounted on axles 128. The ends of the upper pulley axles 128 project outwardly through vertical slots 130 in and opening through the upper edges of the side plates 116. The ends of the lower pulley axles 128 project outwardly through vertical slots 132 in and opening through the lower edges of the side plates.

The corresponding outer ends of the two upper pulley axles 128 are joined by connecting bars 134 at the outer sides of the side plates 116 as are also the corresponding ends of the two lower pulley axles 128. The upper and lower connecting bars 134 at the same sides of the side plates are joined at their centers by springs 136 which urge the upper and lower conveyor belts 122, 124 toward one another to limiting positions wherein the axles 128 engage the ends of their respective side plate slots 130, 132. One upper conveyor pulley 126 is drivably connected by a drive chain 142 to a reversible drive motor 144 for selectively driving the upper conveyor belt 122 in either direction. As explained below, articles 48 being moved by the article conveyor 106 are disposed between the lower run 138 of the upper conveyor belt 122 and the upper run 140 of the lower conveyor belt 124. In the above-mentioned limiting positions of the conveyor belts, the spacing between the belt runs 138, 140 is less than the corresponding dimension of the articles 48 by an amount such that entrance of an article between the belts urges the belts apart slightly against the bias of the springs 136. These springs then retain the belts in frictional contact with the article. Driving of the upper conveyor belt 122 by its drive motor 144 with an article 40 disposed between the belt runs 138, 140 is thus effective to feed the article through the conveyor 106 with the lower conveyor belt 124 serving merely as a supporting idler belt.

Referring to FIG. 5, it will be seen that the conveyor belts 122, 124 extend from the rear side of the access opening 36 in the vending machine control panel 24 to the front end of the passageway 104 through the article storage means 51. The conveyor 106 is operative to feed articles 48 between the gripping jaws 82, 84 of the article transport mechanism 43 and the user accessible position 50 in a manner to be explained presently.

The illustrated vending machine 10 of the invention is intended for use by customers having ID cards 146 (FIG. 8) each bearing a coded label 148 containing information regarding the card owner and for vending articles 48, specifically magnetic tape cassettes such as video cassettes, each bearing a coded label 150 identifying the cassette. An important improvement feature of the invention resides in the unique code reading means 152 in FIG. 8 for reading both the coded label 148 on a customer ID card 146 inserted into the card slot 32 of the vending machine 10 and the coded label 150 on a cassette 48 being vended to or returned by the customer. According to this feature of the invention, the card and cassette coded labels 148, 150 bear coded patterns which may be read by an optical scanner, and the code reading means 152 comprises a single optical scanner 154 for reading both the card and cassette coded labels. The preferred coded label shown contain conventional bar codes and the preferred optical scanner shown is a bar code reader including a laser for reading the bar codes by scanning them with a laser beam. The ID card slot 32 is contained within a card guide 156 located immediately to the right of the infeed/outfeed conveyor 106. Mounted in the card guide for actuation by a card entering the card slot is a microswitch 158. The optical scanner 154 is located at the left of the conveyor 106 with its optical axis 160 passing through the conveyor 106 and card slot 32 normal to the plane of the slot and to the direction line of movement of cassettes by the conveyor. The scanner laser beam scans through a predetermined scanning pattern about the axis 160. The conveyor and card guide have windows 162 on the axis 160 through which the bar code 150 on a cassette is exposed to and read by the laser beam during movement of the cassette in either direction across the axis by the conveyor and the bar code 148 on an ID card is exposed to and read by the laser beam when the card is positioned in the card slot.

Mounted on the infeed/outfeed conveyor 106 are a rear photodetector 164 and a front photodector 166. As shown best in FIGS. 8*a* and 11, each photodetector includes a light source 168 mounted on one conveyor side plate 116 and a photosensor 170 mounted on the other side plate directly opposite the light source. The conveyor side plates 116 have aligned openings 172 through which each photosensor 170 normally receives light from its light source 168. As explained later, during operation of the vending machine a cassette 48 being transported by the conveyor 106 momentarily blocks the passage of light from each light source 168 to its photosensor 170 and thereby changes the state of the photosensor. This change of state of the photosensor 170 of each photodetector 164, 166 in response to movement of a cassette 48 past the photodetector by the infeed/outfeed conveyor 106 is referred to herein as actuating the photodetector.

As noted earlier, the control panel 24 of the vending machine has a currency slot 30 into which paper currency may be inserted for payment of cassette rental charges, deposit fees, and the like. Currency inserted into this slot enters a conventional paper currency validator 172 mounted within the housing enclosure 108.

The vending machine control means 44 and machine operation will now be described by reference first to FIG. 9 which is a block diagram of the control means. It should be noted at the outset that a person skilled in the art to which this invention relates will readily understand the operation of the various components, i.e. blocks, of the control means and how these components must be programmed and functionally related to effect operation of the vending machine in the manner described below. Also, it is well within the skill of a person skilled in this art to implement the various components. The patents mentioned earlier are helpful in this regard and are incorporated herein by reference. It will be further understood that the functions of the control means 44 may be accomplished with a variety of specific component implementations within the scope of the invention.

With the foregoing in mind, the control means 44 comprises a computer 174 which effectively supervises the entire operation of the vending machine through a programable logic controller (PLC) 176. The computer 174 includes a keyboard 174*a*, a video screen 174*b*, internal and external memories 174*c*, and an internal modem 174*c* coupled to a telephone line. The computer and PLC are connected to one another and to a power supply 179 through a bus 180 and a stepper motor drive/computer interfacee unit 182. The PLC is connected to the following elements which provide inputs to the PLC: (a) the gripper retract sensing switch 100 for sensing when the article gripper 76 occupies its fully retracted position relative to the article carriage 68; (b) the article or cassette sensing switch 102 for sensing when an article or cassette 48 is disposed in gripping relation between the gripping jaws 82, 84; (c) the ID card sensing switch 158 for sensing insertion of a customer ID card into the card slot 32; (d) the two photosensors 170 of the photodectectors 166, 168 for sensing an article or cassette 48 in the infeed/outfeed conveyor 106; (e) the paper currency validator 172. The PLC 176 has outputs connected to the following components for controlling the same in accordance with control logic programmed into the computer 174 and the PLC 176: (a) the gripping jaw actuating motor 96 which opens and closes the article gripping jaws 82, 84; (b) the infeed/outfeed conveyor drive motor 144; (c) the stepper motor drive/interface 182 which is coupled to the x, y, and z axis stepper motors 62, 72, and 92 of the transport mechanism 43 to control these motors in accordance with customer inputs to the machine keyboard 26. The keyboard 26, optical scanner 154, and a bar code reading light pen or wand 184 are connected to the computer 174 through an interface 185. The computer 174 is connected to a receipt printer 188 mounted in the control panel enclosure 108 behind the control panel receipt slot 34 and to the control panel display screen 28. All of the above components of the control means 44 are mounted within the vending machine except the keyboard 26 and screen 28 which are mounted on the control panel 24 so as to be accessible to a user or customer of the vending machine.

As noted earlier, while an improved vending machine according to this invention may be constructed and arranged to vend various kinds of articles 48, the particular vending machine illustrated is a cassette vending machine for vending magnetic tape cassettes, such as video cassettes. The operation of this cassette vending machine will now be described.

The cassettes to be vended are loaded into the storage bins 46 of the cassette storage means 40 by opening the rear doors 22 of the vending machine housing 12 and inserting each cassette edgewise into its storage bin through the rear open end of the bin. Each cassette 48, when fully inserted into its storage bin 46, projects a distance beyond the rear end of the bin, as shown in FIG. 5. The location of each cassette 48 in the storage bin array 51 is stored in the machine. To this end, each storage bin 46 has a label 186 (FIG. 7*a*) which is coded to identify the storage bin and is readable by passing the wand 184 across the label . The preferred storage bin label 186 is a bar code label similar to the bar code labelsl48, 150 on the user ID cards 146 and cassettes 48 and bearing a bar code identifying the bin. The wand 184 is a light pen for reading both the bar code labels 150 on the cassettes 48 and the bar code labels 186 on the storage bins 46. When initially loading cassettes 48 into the storage bins 46 o replacing the cassette in a particular storage bin by a different cassette, the bar code label 150 on each cassette and the bar code label 186 on the storage bin 46 in which the cassette is placed are read by wiping the light pen 184 across the labels to associate each storage bin with its contained cassette. This association of the storage bins and their respective cassettes is recorded in the computer memory 174*c*.

The cassettes 48 stored in the vending machine constitute a cassette library whose cassette titles will be listed on a cassette program displayed at or near the vending machine. Each title will be designated by a number or the like representing the storage bin 46 which contains the respective tape cassette.

As noted earlier, the vending machine 10 is selectively operable in a cassette vending mode and a cassette return mode. Operation of the machine in both modes occurs under the control of the computer 174 and PLC 176 which are programmed to effect the vending and return mode operating sequences described below. During the machine operation, the customer is requested by the machine to input certain information into the machine. These machine requests appear on the control panel display screen 28 of the machine. The customer inputs the requested information into the machine by depressing the appropriate key(s) on the control panel keyboard 26.

The cassette vending mode of the vending machine will be described first. A customer wishing to rent a cassette 48 inserts his ID card 146 into the ID card slot 32. As the card enters the card holder 156, it actuates the card switch 158 which then momentarily activates the optical scanner 154 to read the bar code label 148 on the card. The validity of the card and the customer's rental account, which is stored within the machine, are checked. If the card is valid and if the customer's rental account shows a deficiency, the customer is requested to insert the amount of the deficiency into the currency slot 30. If the currency thus inserted into the machine is authenticated by the currency validator 172 or if the customer's rental account is not deficient, the customer is requested to input his personal identification number (PIN) which is then authenticated.

It should be noted here that the control panel 24 of the vending machine may be provided with a retractable protective window which normally covers the entire panel except the card slot 32 and is automatically retracted in response to authentication of an ID card inserted into card slot to enable the customer to access the panel keyboard 26. This widow has been omitted in the interest of simplicity of description and clarity of illustration.

Following insertion of a valid ID card and inputting of the proper PIN, the customer is requested to input whether he wishes to rent or return a cassette. Assuming that the customer inputs a "rent" instruction, he is requested to input the number of the cassette he wishes to rent which he obtains from the cassette program displayed at or near the vending machine. After the customer inputs the desired cassette number, the machine displays the corresponding cassette title and requests the customer to confirm that this is the correct cassette. Assuming that the customer inputs the proper response to confirm that the cassette title displayed by the machine is the title of the cassette he wishes to rent, the machine requests the customer to insert the proper rental amount into the paper currency slot 30.

Assuming that the paper currency inserted into the machine is authenticated by the currency validator 172, the machine activates the article or cassette transport means 42 to retrieve the customer selected cassette 48 from its storage bin 46 and deliver the cassette to the user accessible position 50 from which the cassette may be removed by the customer. This cassette retrieval and delivery occurs in the following manner. The computer 174 and PLC 176 are programmed to activate the stepper motor drive in such a way that in the normal standby status of the vending machine, the cassette transport mechanism 43 occupies its solid line home position of FIG. 5, wherein its cassette gripper 76 is retracted to its solid line rear position and aligned with the central passageway 104 through the cassette storage means 40. Upon authentication of the currency inserted into the machine, the x-axis and y-axis motors 62, 72 of the transport mechanism 43 are activated by the stepper motor drive 182 to drive its cassette gripper 76 to a position opposite the storage bin 46 containing the cassette selected by the customer. The z-axis motor 92 of the transport mechanism 43 is then activated to extend the gripper 76 forwardly toward the cassette storage means 40 until its gripping jaws 82, 84 straddle the projecting rear end of the selected cassette and the rear cassette end engages and actuates the gripper switch 102. Actuation of this switch deactivates the z-axis motor 92 and activates the jaw motor 96 to close the gripping jaws 82, 84 into firm gripping contact with the rear end of the cassette.

The z-axis motor 92 of the transport mechanism 43 is now activated in a reverse direction to retract the cassette gripper 76 rearwardly and thereby retract the selected cassette 48 from its storage bin 46 until the jaw motor 96 engages and actuates the gripper retract sensing switch 100. This actuation of the switch 100 deactivates the z-axis motor 92 and reactivates the x-axis and y-axis motors 62, 72 of the transport mechanism 43 to drive the cassette gripper 76 back to its home position wherein the cassette 48 now gripped by the gripping jaws 82, 84 is aligned with the center passageway 104 through the storage means 40. The z-axis motor 92 of the transport mechanism 43 is now actuated to extend the gripper 76 forwardly through the passageway 104 to its broken line extended position of FIG. 5, wherein the front end of the gripped cassette enters the rear end of the infeed/outfeed conveyor 106 and projects between the light source 168 and photosensor 170 of the rear photodetector 164. The rear photodetector is thereby actuated by the cassette.

This actuation of the rear photodetector 164 activates the gripping jaw motor 96 to open the gripping jaws 82, 84 and release the cassette 48 and activates the drive motor 144 of the conveyor 106 to feed the cassette forwardly from the gripping jaws, past the front photodetector 166, and finally through the control panel access opening 36, to the user accessible position 50 for removal of the cassette by the customer. Movement of the cassette past the front photodetector 166 effects momentary activation of the optical scanner 154 to read the bar code label 150 on the cassette (i.e. the cassette title) as the label crosses the scanning axis 160 of the scanner. This cassette title is compared with that selected by the customer, and if the titles match, the cassette is delivered to the customer as described. If the titles do not match, the transport means 42 is immediately reversed to return the cassette to its storage bin 46 and the customer is instructed to make another selection. The error is also recorded in the machine for later correction by the machine operator. In either case, the photodetectors 166, 168 are restored to their normal state in readiness for its next operation.

Operation of the vending machine in its cassette return mode will now be described. A customer wishing to return a previously rented cassette 48 to the vending machine 10 inserts his ID card into the machine which then checks the customer's rental account and requests the customer to insert the amount of any deficiency and input his PIN, all in the same manner as in the vending mode of the machine. The customer is now requested to input whether he is renting or returning a cassette. The machine responds to the customer's input of the "returning" instruction by activating the z-axis motor 92 and gripping jaw motor 96 of the cassette transport mechanism 43, which occupies its solid line home position of FIG. 5, to extend the cassette gripper 76 forwardly to its broken line position of FIG. 5 and open the cassette gripping jaws 82, 84. Simultaneously, the infeed/outfeed conveyor drive motor 144 is activated to drive the infeed/outfeed conveyor 106 rearwardly, a countdown of a preset time period, such as a 15 second time period, is started, and the customer is requested to insert the cassette being returned into the control panel access opening 36.

Insertion of the cassette into the access opening 36 engages the cassette with the now operating infeed/outfeed conveyor 106. The conveyor feeds the cassette rearwardly across the scanning axis 160 of the optical scanner 154. Embodied within the optical scanner is a motion detector (not shown) which senses the rearward movement of the cassette and momentarily activates the optical scanner to read the bar code lable 150 on the cassette as the latter moves rearwardly past the scanner. The cassette bar code is checked against the bar codes in the vending machine bar code inventory. If the cassette bar code is verified, the cassette is returned to its storage bin 46 in the manner explained below, and the customer is requested to input a new rent or return instruction or remove his ID card. If the cassette bar code is not verified, the infeed/outfeed conveyor 106 is immediately reversed to return the cassette to the customer, and the customer is instructed to reinsert the cassette into the machine.

Rearward movement of the returned cassette by the infeed/outfeed conveyor 106 occurs past the front and rear photodetectors 166, 168 which are thereby actuated by and thus serve to detect the presence of the cassette. If this cassette detection occurs without detection by the optical scanner 154 of any bar code on the cassette, due, for example, to insertion of a cassette in the wrong position or insertion of a cassette without a bar code label, the conveyor 106 is immediately reversed to return the cassette to the customer with instructions to reinsert the cassette into the machine. If the preset time period referred to above expires without insertion of a cassette into the machine or if a customer makes a preset number of unsuccessful attempts to insert a cassette, the customer is advised that the vending machine will not accept the cassette and instructed to remove his ID card and return the cassette in some other specified way. Return of the card switch 158 to its normal position in response to removal of the customer's ID card from the vending machine effects return of the machine to its standby status in readiness for its next use.

All of the vending machine transactions are recorded in the computer memory 174*c*. The machine includes a printer 188 and a video 190 within the machine housing 12 connected to the computer 174 for printing out or reading out the stored transaction records and list of cassettes stored in the machine. Modem 174*d* connects the control means 44 to a telephone system to permit the machine records to be transmitted over the phone lines to the vending machine operator and/or permit customers to reserve selected cassettes by telephone using telephone dial tones to instruct the machine regarding their PINs and the cassettes to be reserved. The control means is programmed to read these dial tone instructions and to inactivate the machine against vending the reserved cassettes for a preset period of time except in response to inputting of certain special information into the machine keyboard 26 by the reserving user, such as his PIN. According to another feature of the invention, the control means 44 may be programmed to count down a preset time period following each vending of a cassette to a customer and credit the customer with or return to the customer the amount of his deposit in the event he returns the cassette within this time period.

From the forgoing description, it will be understood that the transport means 42 is operative to transport articles or cassettes 48 between selected storage bins 46 and the user accessible position 50 through the intermediate article or cassette position shown in broken lines in FIG. 5. The carriage 68 of the article conveyor or transport mechanism 43 is movable between a first article transfer position opposite a selected storage bin 46, where an article or cassette is transferred between the storage bin and the conveyor, and a second article or cassette transfer position opposite the infeed/outfeed conveyor 106, where an article or cassette is transferred between the conveyor 43 and the conveyor 106 through the storage array opening 104 and at the intermediate article or cassette position shown in broken lines in FIG. 5. The transfer is accomplished at each transfer position by extension and retraction of the article holding or gripping means 82,84 relative to the carriage 68.

Referring to FIGS. 12 and 13, the modified article or cassette transport mechanism 43*a* illustrated is essentially the same as the transport mechanism 43 except in the following respects. The lead screws 60, 70 of the transport mechanism 43 are replaced in the transport mechanism 43*a* by perforated drive tapes 60*a*, 70*a* engaging toothed sprockets on the x-axis and y-axis motors 62*a*, 72*a*. The pinion rack bar 78*a* of the article or cassette gripper 76*a* of the modified transport mechanism comprises a bar 76*b* proper having a longitudinal channel 76*c* in its upper side and a perforated drive tape 76*d* fixed to the upper side of the bar with its perforations aligned with the channel. The z-axis motor 92*a* mounts a toothed sprocket 94*a* whose teeth engage the perforations in the tape 76*d*. The operation of the modified transport mechanism 43*a* is identical to that of the transport mechanism 43.

The inventor claims:

1. In an article handling machine operable by users having identification (ID) cards bearing user identifying codes for handling articles bearing article identifying codes, the combination comprising:

ID card receiving means into which a user may insert his ID card, transport means for transporting articles between certain positions, and a single common code reader for reading both the user code on a user ID card inserted into said card receiving means and the article code on an article transported between said positions by said transport means.

2. The article handling machine combination of claim 1 wherein:

said user codes and article codes comprise bar codes, said code reader comprises an optical code reader, said card receiving means comprises a card slot for receiving an ID card and locating the card with its user code disposed incode reading relation to said optical code reader, and said article transport means moves an article past said optical code reader with the article code on the article disposed in code reading relation to the optical code reader.

3. The article handling machine combination of claim 1 wherein:

said user codes and article codes comprise bar codes, said code reader comprises an optical scanner having a scanning axis, said card receiving means and article transport means are disposed side by side along said axis, said card receiving means comprises a card slot along and transverse to said axis for receiving a user ID card and locating the card with its user code disposed in code reading relation to said optical scanner, and said article transport means transports an article across said axis in a plane transverse to the axis with the code on the article disposed in code reading relation to said scanner.

4. The article handling machine combination of claim 3 wherein:

said optical scanner comprises means for scanning a laser beam over a user ID bar code disposed in said user code reading relation to said scanner and for scanning said beam over an article bar code disposed in said article code reading relation to said scanner.

5. The article handling machine combination of claim 1 wherein:

said user and article codes comprise bar codes, and said code reader comprises an optical scanner for scanning a laser beam over both the user bar code on a user ID card inserted into said card receiving means and the article bar code on an article transported between said positions by said transport means.

6. The article handling machine combination of claim 1 wherein:

said machine is a vending machine for vending articles that are returnable to the machine by placing the articles in a user accessible position which constitutes one of said certain positions, said machine includes article storage means for storing each article to be vended in a storage position which constitutes another of said certain positions, said transport means is selectively operable in an article vending mode to transport a selected article from said storage means to said user accessible position and in an article return mode to transport a returned article from said user accessible position to said storage means, and said code reader reads (a) the user code on a user ID card inserted into said card receiving means and the article code on an article being vended in said article vending mode, and (b) the user code on a user ID card inserted into said card receiving means and the article code on an article being returned in said article return mode.

7. The article handling machine combination of claim 1 wherein:

said user codes and said article codes comprise bar codes, said code reader comprises an optical scanner having a scanning axis, said card receiving means comprises a card slot along and transverse to said axis for receiving a user ID card and locating the card with its user code disposed in code reading relation to said optical scanner, and movement of an article between said certain positions by said article transport means occurs across and in a transverse plane of said axis with the article code on the article disposed in code reading relation to said optical scanner.

8. The article handling machine combination of claim 7 wherein:

said optical scanner comprises means for scanning a laser beam over a user ID bar code disposed in said user code reading relation to said scanner and for scanning said laser beam over an article bar code disposed in said article code reading relation to said scanner.

9. The article handling machine combination of claim 8 wherein:

said articles comprise magnetic tape cassettes.

10. The article handling machine combination of claim 9 wherein:

said machine is a vending machine for vending articles that are returnable to the machine by placing the articles in a user accessible position which constitutes one of said certain positions, said machine includes article storage means for storing each article to be vended in a storage position which constitutes an other of said certain positions, said transport means is selectively operable in an article vending mode to transport a selected article from said storage means to said user accessible position and in an article return mode to transport a returned article from said user accessible position to said storage means, and said code reader reads (a) the user code on a user ID card inserted into said card receiving means and the article code on an article being vended in said article vending mode, and (b) the user code on a user ID card inserted into said card receiving means and the article code on an article being returned in said article return mode.

11. A method of monitoring an article handling machine wherein articles bearing article identifying codes are transported between certain positions in response to activation of the machine by users having identification (ID) cards to be inserted into the machine and bearing user identifying codes, said method comprising the steps of:

providing the machine with a code reader capable of reading said user and article codes, locating each user ID card inserted into the machine in a user code reading position, transporting each article between said certain positions through an article code reading position, and operating said code reader to read both the user code on a user ID card disposed in said user code reading position and the article code on an article disposed in sad article code reading position.

12. The method of claim 11 wherein;

said user and article codes are bar codes, said code reader is an optical scanner having a scanning axis, said ID card locating step comprises locating each user ID card inserted into the machine in a user code reading position wherein its user bar code is disposed along and in a transverse plane of said axis, and said article transporting step comprises transporting each article through an article code reading position wherein its article bar code is disposed along and in a transverse plane of the axis.

13. The method of claim 12 wherein:

said optical scanner is operable to read the user bar code on a user ID card disposed in said user code reading position and the article bar code on an article disposed in said article code reading position by scanning a laser beam over the user bar code on the ID card in said user code reading position and scanning said laser beam over the article bar code on the article in said article code reading position.

14. The method of claim 13 wherein:

said articles comprise magnetic tape cassette ' said machine is a vending machine which is selectively operable in a vending mode to transport a selected cassette from a storage position which constitutes one of said certain positions to a user-accessible position which constitutes another of said certain positions, and in a return mode to transport a cassette from said user-accessible position to its storage position.

15. In a vending machine for differing articles each bearing an identifying code and operable in at least one of the following operating modes: (a) a vending mode involving vending a selected article to a machine user, and (b) a return mode involving receiving a returned article from a user, the combination comprising:

storage means for containing the articles to be handled and including a storage bin for each article, a bin identifying code at each storage bin identifying the respective bin, means for associating each article and its respective storage bin including means for reading the bin code at each storage bin and the article code on the article in the respective bin, and control means for storing information representing each bin and its associated article, means for transporting articles between said storage means and a user accessible position which is accessible to machine users for at least one of the following purposes: (a) removal of vended articles from said accessible position, and (b) placement of returned articles in said accessible position, and means controlled by and responsive to information stored in said control means for actuating said transporting means to transport a selected article from its storage bin to said user accessible position during operation of the machine in said operating mode (a) and to transport a returned article from said user accessible position to its associated storage bin during machine operation in said operating mode (b).

16. The article handling machine combination of claim 15 wherein:

said article codes and said storage bin codes comprise bar codes, and said means for reading said article codes and said bin codes comprises a common bar code reader.

17. The article handling machine combination of claim 16 wherein:

said common bar code reader comprises a bar code reading wand.

* * * * *